United States Patent [19]

Bradel et al.

[11] 3,757,956

[45] Sept. 11, 1973

[54] TWIN BASKET STRAINER

[75] Inventors: Norman F. Bradel, Scott Township, Allegheny County; Herbert L. Hormel, Oakdale, both of Pa.

[73] Assignee: S. P. Kinney Engineers, Inc., Carnegie, Pa.

[22] Filed: Mar. 9, 1972

[21] Appl. No.: 233,180

[52] U.S. Cl. .............................. 210/333, 210/340
[51] Int. Cl. ..................... B01d 35/12, B01d 29/38
[58] Field of Search ..................... 210/333, 340, 341

[56] References Cited
UNITED STATES PATENTS

| | | | |
|---|---|---|---|
| 2,447,952 | 8/1948 | MacNeill | 210/341 |
| 1,685,303 | 9/1928 | Vourheis | 210/340 |
| 1,150,086 | 8/1915 | Willemstyn | 210/333 |
| 1,721,233 | 7/1929 | Royle | 210/341 |

*Primary Examiner*—Frank A. Spear, Jr.
*Attorney*—William H. Parmelee

[57] ABSTRACT

A twin basket strainer for industrial use has two baskets through which water to be strained is alternately passed so that one basket may be cleaned while the other is in use. Each basket is in a separate chamber, each chamber having an inlet port and an outlet port. A shaft supported in the body of the structure has a handle outside the body, and inside the body it has a valve disk near each end so arranged that when the shaft is rocked through a few degrees of arc the valve disks move from a position over the inlet and outlet ports of one chamber to a position clear of said ports but closing the corresponding ports of the other chamber.

8 Claims, 6 Drawing Figures

Patented Sept. 11, 1973
3,757,956
2 Sheets-Sheet 1
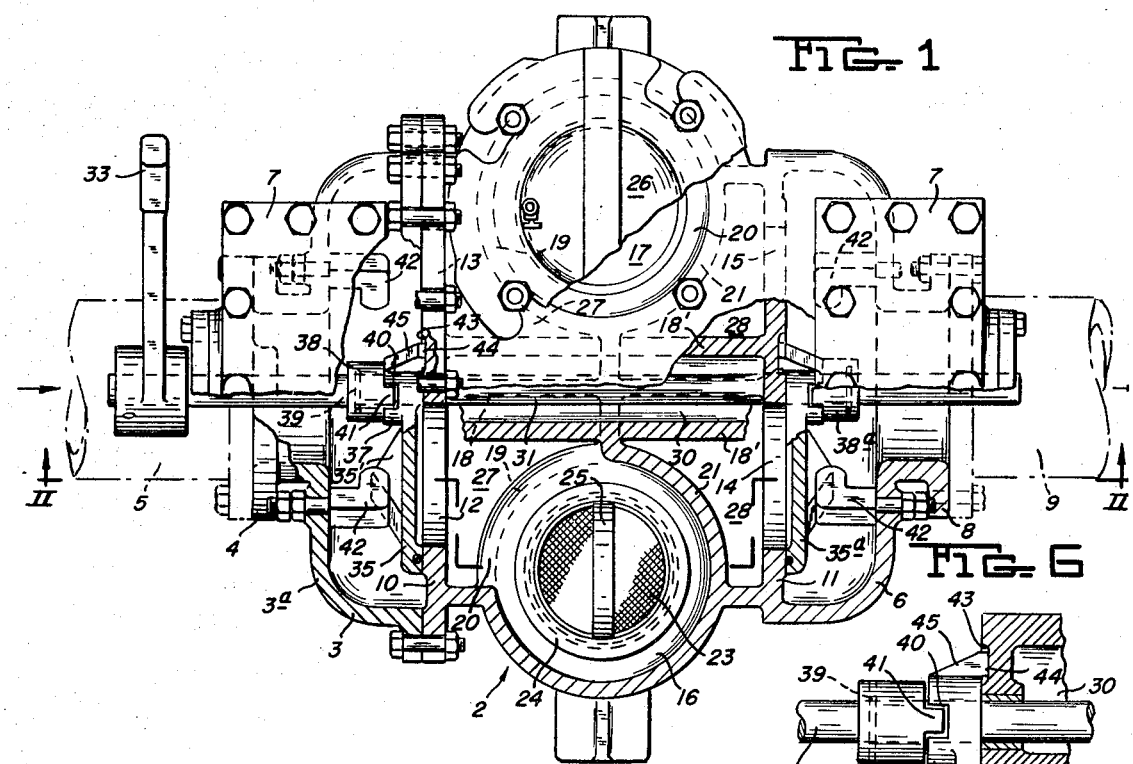
FIG. 1
FIG. 6
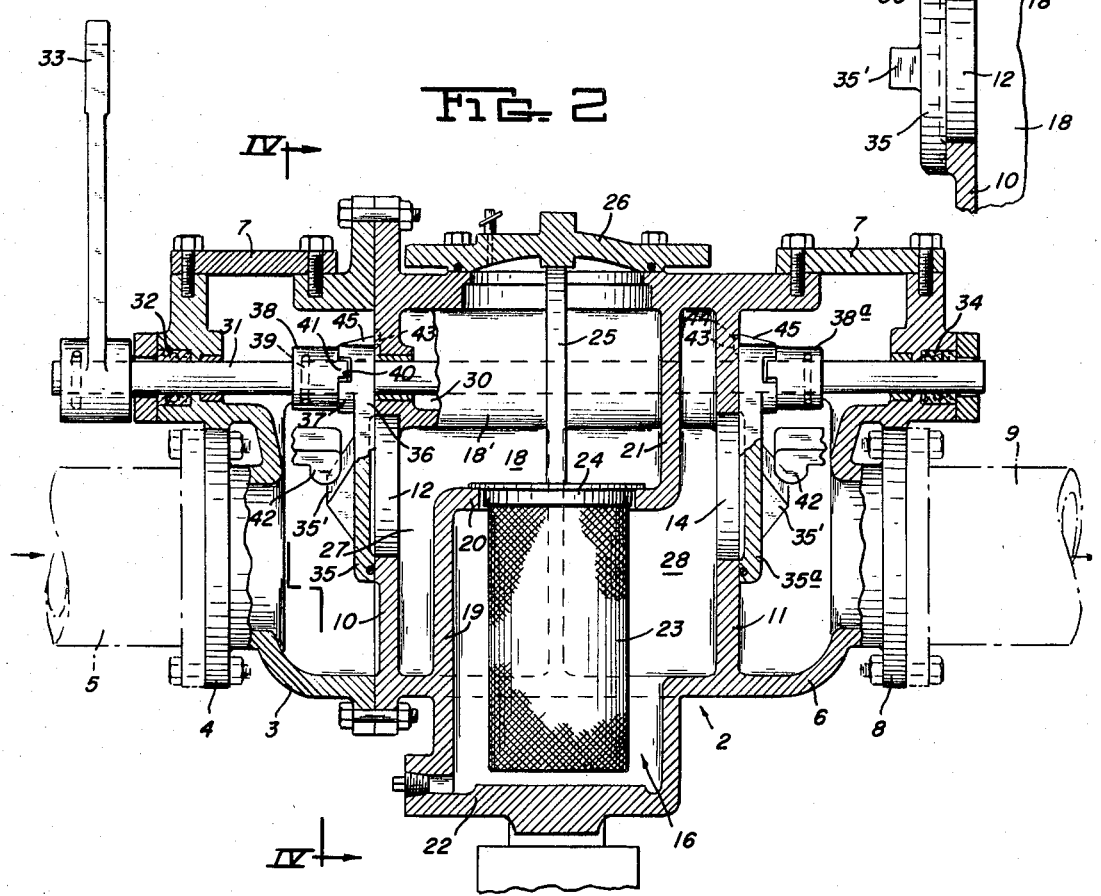
FIG. 2

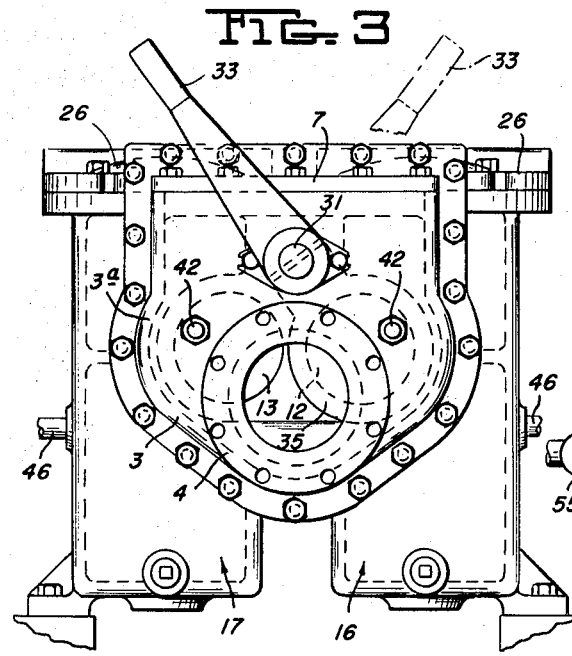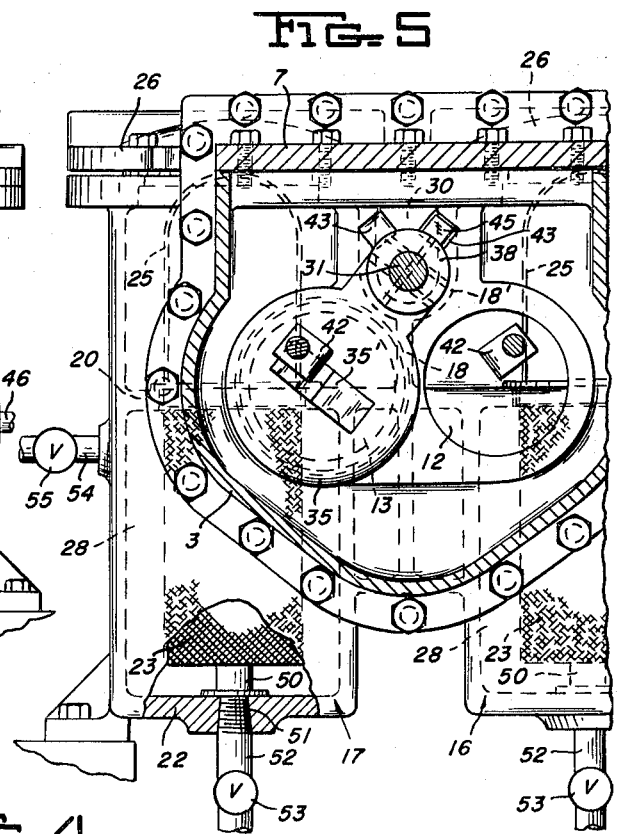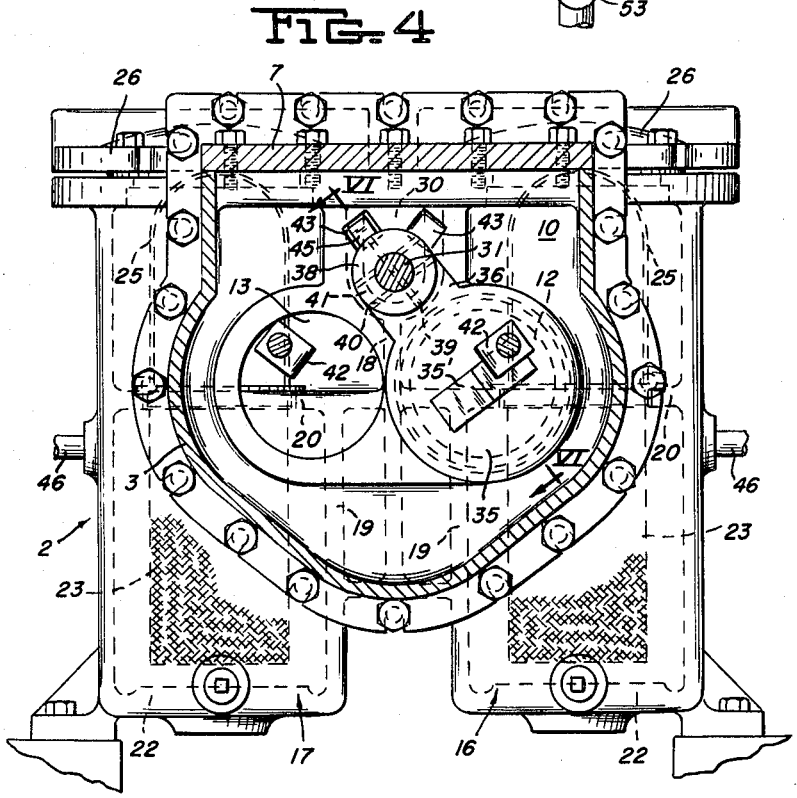

TWIN BASKET STRAINER

This invention is for a strainer for industrial use in removing solids from water or other liquid. The strainer is known as a twin basket strainer with valves arranged to direct the liquid being filtered alternately through one strainer basket and then the other so that while one basket is in use the other may be cleaned or backwashed to remove collected solids.

Twin basket strainers are commonly used for removing solids from water to be used for some industrial purpose or for removing solid wastes from water which has been used in some industrial operation, either for reuse or return to the natural source from which it may have been taken. By way of explanation and not as any limitation, the term "water" will often be herein used, but without excluding the use of the strainer to other liquids wherever it is applicable.

As heretofore generally constructed, twin basket strainers have involved expensive valving arrangements and operating means for directing the liquid flow alternately through one basket and then the other. Each basket is in a separate chamber, each with an inlet port and an outlet port. The inlet ports open to a common inlet for the water or other liquid to be strained, and the outlet ports of each communicate with a common outflow passage, so that it is desirable to close both the inlet port and the outlet port for the same chamber simultaneously and simultaneously with the opening of the inlet and outlet ports of the other chamber. As heretofore constructed, this has generally involved parallel screw shafts interconnected by sprocket chains or in some cases, fluid pressure-operating means with two inlet valve disks, one for the inlet port of each chamber and two outlet valve disks, one for each of the outlet ports of the two chambers.

The present invention provides a twin basket strainer of simple, compact construction. There is a main body structure providing the usual two chambers into each of which a strainer basket is confined in such manner that entering water from the common inlet flows from an inlet port down into each strainer basket into the chamber surrounding the basket and thence to an outlet port. There is a single shaft rotatably supported in the body structure with one end projecting from the body having an operating element or lever. Carried on the shaft inside the body are two valve disks which may be simultaneously moved by operation of the lever from a position where they close the inlet and outlet ports of one basket chamber to a position where said ports are open and the corresponding respective ports of the other basket chamber are closed. Thus, by moving the lever through a limited arc, desirably less than 90°, the flow of water or other liquid may be alternately directed through the strainer basket in one chamber or the other. Instead of the respective valve disks being keyed directly to the rock shaft, there is a slight lost motion connection between the shaft and the disks to enable a sharp blow or impact to be delivered to the disks in starting to move them. Also the disks have a limited axial movement on the shaft so that they may be pressed into sealing engagement with the ports over which they are positioned and held in said position. The invention further provides means for releasably wedging and holding the disks in seated position until such time as they are to be moved.

The invention is applicable to either manual or automatic operation including automatic back flushing or backwashing of the baskets.

The invention may be more fully understood by reference to the accompanying drawings showing a preferred embodiment of the invention and in which:

FIG. 1 is a top plan view of the strainer with a part of the enclosure broken away to show the interior;

FIG. 2 is a longitudinal combined side elevation and vertical section in the plane of line II—II of FIG. 1;

FIG. 3 is an end elevation looking toward the left end of the strainer as viewed in FIG. 1;

FIG. 4 is a transverse sectional view in substantially the plane of line IV—IV of FIG. 2;

FIG. 5 is a view similar to FIG. 4, but showing the valve disk for the inlet port of the basket chamber moved to the port on the left side and also showing a slight modification adapting the strainer to automatic operation, or automatic backwash.

FIG. 6 is a fragmentary detail sectional view of the valve disk in seated position over one port and the manner of its connection with the rock shaft.

Referring in detail to the drawings, the strainer has a main body 2 which for the most part is hollow. At one end, preferably the inlet end, there is bolted a cover or end section 3 which is really a part of the body. It has a flanged inlet connection 4 to which an inlet pipe 5, indicated in broken lines, is bolted. It is through this pipe that water or other liquid from which solids are to be removed, enters the body. At the other end of the body there is a section 6 similar to the section 3. It may be bolted in place, similarly to the body section 3, but is here shown as being integral with the main body of the strainer. Removable cover plates 7, bolted in place to the tops of portions 3 and 6, afford access, when necessary, to the interior of the respective body portions 3 and 6. Body portion 6 has a flanged outlet connection 8 to which an outlet pipe 9, shown in broken lines in FIG. 2 is connected, and to which the strained water is delivered.

The main mid-portion 2 of the body has a transverse wall 10 therein at the left or inlet end as viewed in FIGS. 1 and 2, and a similar parallel transverse wall 11 at its right or outlet end. Transverse wall 10 has two separate but similar water inlet ports 12 and 13 therethrough in close side-by-side relation separated only by a distance equal to or slightly greater than the thickness of the partition wall 18 and wall 11 has two strained water outlet ports 14 and 15 therethrough, these ports being in direct alignment, respectively, with inlet ports 12 and 13.

Within the main body 2 is the central portion between the respective transverse walls 10 and 11 are two separate spaces or basket-receiving chambers 16 and 17, one of which is at each side of longitudinally-extending central wall or partition 18. Each of these chambers has a lower side wall 19 therein, a horizontal basket-supporting interior partition wall 20 with an opening therein, and an offset upper side wall portion 21. Each chamber has a countersunk bottom wall 22. Each chamber has a cylindrical straining basket 23 therein formed of a foraminous medium, such as screen or perforated sheet metal. The bottom of each basket may also be formed of such a straining medium or with the arrangement shown in FIG. 5 is desirably closed. The top of each basket has an annular flange 24 thereabout which seats on the horizontal wall 20 and suspends the basket in an enclosure or chamber of contact with the chamber walls. Each basket has a bail of rigid strap metal 25 extending upwardly therefrom.

The top of the main section 2 of the body has quick releasable circular covers 26 thereon over the top of each basket and the bail 25 of the baskets contact the under sides of their respective covers for holding the baskets in place with their flanges 24 seated on the top of horizontal partition wall 20, but upon removal of either cover 26, the basket beneath can be readily removed, cleaned and replaced.

As most clearly seen in FIGS. 1 and 2 there is a water inlet compartment 27 in each basket chamber between the respective inlet ports 12 and 13 in the front transverse wall 10 and the offset vertical wall portion 21 from which incoming water must flow down into the inside of its basket 23. Each basket chamber also comprises that space or outlet compartment 28 around the outside of each basket between the right side of the side wall 19, under the horizontal partition wall 20 and up into the space between the right of the offset vertical wall portion 21 and the transverse partition wall 11 in which the outlet ports 14 and 15 for the respective basket chambers are located. From this it will be seen that each basket chamber has an inlet compartment and an outlet compartment with the strainer basket effectively interposed therebetween in such manner that water entering the inlet port 12 or 13 must flow through the basket to the outlet port 14 or 15 respectively.

Summarizing, there is a composite body structure comprising mid-portion 2 and end portions 3 and 6. Within this body are parallel transverse partitions 10 and 11. There is an inlet portion forwardly of wall 10 and the left end of the composite body and an outlet portion between transverse wall 11 and the other end of the composite body. Between the two transverse partitions 10 and 11 there is a longitudinal partition 18, thereby forming two side-by-side basket chambers. Wall 10 has two inlet ports 12 and 13, one of which opens into one chamber and the other into the other chamber. Partition 11 has two outlet ports 14 and 15, one for each basket chamber. In each chamber, as above explained, there is an inlet compartment and an outlet compartment with the basket interposed between them.

The top of the longitudinal internal partition wall 18 between the two basket chambers 16 and 17 is divided at 18' to form a generally U-shaped cavity 30 in the upper portion of the body between the transverse vertical walls 10 and 11 (see FIGS. 4 and 5).

There is a longitudinally-extending rock shaft 31 extending longitudinally in the U-shaped cavity 30, through the upper portions of partition walls 10 and 11. One end passes through a packed bearing 32 in the left side of the end section 3 of the body and extends beyond the end of the body. It has an operating means, such as a hand lever 33 fixed thereto. The other end of the shaft is received in a packed bearing 34 in the right end of the portion 6 of the body.

There is an inlet valve disk 35 having an extension 36 with a boss or hub 37 through which the shaft 31 passes. As most clearly seen in FIG. 6, there is a sleeve 38 on the shaft 31 and immovably fixed to the shaft by a pin 39. One end of the hub 37 confronts one end of the sleeve 38, and said end has a transverse notch 40 therein into which transverse lug 41 on the confronting face of the sleeve projects. The notch 40 is a fraction of an inch wider and deeper than the width and length of the lug 41. With this clutch-like arrangement, rotation of the shaft 31 will be transmitted to the valve disk 35 and the valve disk is confined between the sleeve 38 and the transverse partition wall 10, but there is a slight lost rotational motion between the shaft and the valve disk because of the clearance between lug 41 and the sides of notch 40 and there may be slight motion of the valve disk axially relative to the shaft because of endwise clearance between the ends of lug 41 and the deeper notch 40 and a corresponding clearance between the confronting ends of hub 37 and sleeve 38.

The valve disk may be moved in an arc, as above explained, between a position where it is over inlet port 12 for one basket chamber (i.e., the position shown in FIGS. 2, 4 and 6) with port 13 open and a position where port 13 is closed and port 12 is open. The outer or left face of the valve disk 35 has a cam element 35' thereon with surfaces of decreasing height from its center toward the ends. There is a cooperating abutment 42 on the front wall 3a of the separate body portion 3 at each side of and below the shaft 31. These abutments are here shown as being adjustable toward and away from the plane of travel of the valve member 35, but may also be integrally formed on the front wall. These abutments are so arranged and located that when the valve member 35 is moved into closing position over one or the other of the ports 12 or 13 one of the inclined surfaces of the cam 35' will wedge under the juxtaposed abutment 42 to press and hold the valve tightly seated around the port 12 or 13, one sloped surface of the cam and one abutment functioning when the valve is over one port and the second when the valve disk is over the other port. The slight endwise play of the hub or boss 37 on the shaft 31 allows this wedging action to be effective.

There are two shallow recesses or cavities 43 in the outer surface of the end wall 10, one of which is located to receive a projection, such as the projection 44 on the end face of the lug 45 on the boss 37 of the valve when the valve is seated over one or the other of the inlet ports 12 and 13 so that to move the valve from one position to the other, the lug 45 must move in a direction normal to the surface of the end wall 10 away from said end wall to clear the cavity 43 in which it is received, and for this purpose the cavity wall is sufficiently inclined to exert a camming action on the valve 35.

Near the other end of the shaft 31 there is a second valve member 35a which is exactly in line with valve 35 and is a "mirror image" of valve 35, and all parts associated with the operation of valve 35 are duplicated but reversed for the valve 35 which moves between a closed position over outlet port 14 when 15 is open and a closed position over port 15 when port 14 is open in isochronism with valve 35 so that when valve 35 covers inlet port 12, outlet port 14 is also covered and the entire flow of water or liquid is through the basket in chamber 17 and chamber 16 is sealed at both the inlet and outlet ports so that the cover 26 for this chamber may be removed and the basket taken out and cleaned. Just the reverse is true when valves 35 and 35a cover their respective outlet ports 13 and 15. Since all of the elements associated with valve 35 are duplicated but reversed for valve 35a and sleeve 38a on the shaft 31, the same reference numerals at the left end also designate corresponding parts at the right end. The valve 35a is moved in a direction normal to the exterior of the transverse wall 11 in the same manner but in the opposite direction as the valve 35. For the sake of brevity, details of construction and operation for valve 35a are not herein duplicated.

It is important to observe, however, that both valves 35 and 35a have limited freedom of movement along shaft 31 to allow for the wedging of the respective disks over the ports to which they are moved and provide for the release of the wedging action when a shift is required, and also that there is a slight lost motion between the sleeves 38 and 38a and the valve members 35 and 35a, respectively. This allows for a short free travel of the operating lever 33 before the lug 41 of the sleeves 38 and 38a contact the sides of the notches 40 of the hubs or bosses 37 toward which they move so as to deliver a moderate sharp blow or impact that will loosen the valves 35 and 35a and thereby more easily release them if they are stuck, for example, after a period of non-use, and more easily effect the dislodgment of the projections 44 from the recess 43 at the opposite sides of the strainer. As is usual in twin basket strainers, provision may be made for substantially equalizing the pressure in the basket chamber which is closed or off stream before the valves are shifted to thereby make the operation easier, and valved pipes 46 at the side of each chamber connected to a source of water under pressure (not shown) indicate this.

It has heretofore been explained that FIG. 5 shows substantially the arrangement shown in FIG. 4, but with the valve disk 35 over the inlet port 13 instead of inlet port 12 as in the other figures, but there is also shown a slight modification to adapt the strainer for automatic backwashing. It will be here seen that the baskets 23 have a tubular extension 50 at the bottom, the lower end of which is flanged to set over an opening 51 in the bottom wall 22 of the basket chamber. A drain pipe 52 is screwed into this opening and it has a normally closed valve 53 therein. In the exterior wall of the body at each side thereof there is a water supply pipe 54, each with a valve 55. Each pipe 54 opens into one of the spaces 28 in the basket chamber around the outside of the basket and below the partition 20 on which the top of the basket sets.

With this arrangement the water supply valve 55 and the drain valve 53 for one basket chamber may be opened when the inlet and outlet ports for that chamber are closed by the valve disks 35 and 35a for that basket chamber, whereupon clean water supplied through the pipe 54 will flow through the sides of the basket in the reverse direction, that is from the outside to the inside, and thereby dislodge collected solids in the basket and flush them out the bottom. The valves 53 and 55 are usually operated automatically at regular intervals in timed relation to the operation of valves 35 and 35a, but they may be manually operated. The baskets may be either perforated or woven wire elements or molded foraminous filters, depending on the use to which the strainer is to be put.

We claim:
1. A twin basket strainer comprising:
   a. a generally hollow body having opposed ends and having two spaced transverse interior walls spaced from the ends providing within the body a central portion between said two walls and an inlet chamber between one of said transverse walls and one end and an outlet chamber between the other of said transverse walls and the other end,
   b. the body having an inlet pipe connection at the inlet end opening into the inlet chamber and an outlet pipe connection at the other end aligned with the inlet pipe connection for discharge of strained liquid from the outlet chamber,
   c. a lengthwise-extending vertical partition in the central portion extending between said two transverse partitions dividing the central portion into two separate spaces,
   d. internal partition means in each of said spaces having an opening therein with a removable basket strainer having its upper end seated in said opening, said means being arranged to direct liquid entering said space into the top of the basket strainer, said basket strainer extending perpendicularly to a center line from the inlet pipe connection to the outlet pipe connection with the two strainers being in side-by-side relation,
   e. said internal partition means also forming enclosures spaced from but enclosing their respective basket strainers,
   f. the transverse partition between the inlet chamber and the central portion having two ports therethrough positioned side-by-side at a level near the level of the tops of the baskets, one of which leads from the inlet chamber into one of said spaces and the other into the other of said spaces, said other transverse partition having two ports therethrough similarly positioned at the same level and aligned with said previously-mentioned two ports, one connecting one of said basket enclosures with the outlet chamber and one leading from the other of said basket enclosures into said outlet chamber,
   g. a rock shaft in the upper portion of said central portion at the top of the lengthwise-extending partition at a level above the tops of the removable baskets having one end supported in one end of the body and having its other end passing through the other end of the body and projecting therefrom above one of said pipe connections, the projecting end of said shaft having an operating lever fixed thereto, and
   h. a valve disk on said shaft in the inlet chamber confronting the transverse partition between the inlet chamber and the central portion selectively movable by rotation of the shaft between a position where it covers only one or the other of the two ports in said partition and another valve disk on said shaft in the discharge chamber confronting the transverse partition between the discharge chamber and the central portion arranged to move with the rotation of the shaft in a manner to remain in alignment with said first valve disk so that both disks close the inlet and outlet ports for the same basket at the same time.

2. A twin basket strainer as defined in claim 1 wherein there is a means for connecting each of said valve disks to the shaft providing a limited free rotation of the shaft before turning motion thereof is transmitted to the respective valve disks.

3. A twin basket strainer as defined in claim 1 in which the connection between the operating means for the shaft and the valve disks carried on the shaft provides limited lost motion between the operating means and the valve disks so arranged that initial motion of the operating means can impart an impact to jar the respective valve disks loose and initiate the movement of the valves from over the inlet and outlet ports for one chamber to position over the said ports of the other chamber.

4. A twin basket strainer as defined in claim 1 in which the valve disks are movable relatively to the shaft in a direction normal to the plane of the ports which they cover and uncover, and there are cooperating camming means on the respective valve disks for forcing them toward the ports as they move to port-closing position.

5. A twin basket strainer as defined in claim 4 in which there are other camming means on the respective valves for forcing them away from the ports which they cover and uncover as they move to port-opening position.

6. A twin basket strainer as defined in claim 1 in which each valve disk has an eccentrically positioned boss thereon through which the shaft passes by which each valve disk is rotatably and slidably hung from the shaft, each said boss having a notch therein, the shaft having a separate sleeve fixed thereon adjacent each valve and confronting the boss of that valve to which it is adjacent and confining said valve disk to limited endwise movement on the shaft in a direction normal to the transverse partition with which the disk is associated, each such sleeve having a lug thereon loosely engaged in the notch of that boss which it confronts and by which turning motion of the shaft is transmitted to the valve disk with the loose fit providing limited lost motion between the shaft and the valve disk, there being a pair of separated recesses in each of said transverse partition, the disk valves each having a projecting lug thereon which enters one recess when the valve disk is over one port and the other recess when it is over the other port and from which it is disengaged by movement of the valve disk in a normal direction away from the confronting partition when the valve disk is operated to open a port in said partition, and cooperating means on each valve disk and a portion of its strainer body for camming the respective disks in a direction normal to the confronting partition into tight sealing engagement with their respective ports as the disks are moved to port-closing position.

7. A twin basket strainer as defined in claim 1 in which each strainer basket has an outlet tube at the bottom thereof and each basket chamber has a drain port at the bottom thereof in the outlet compartment with a valve-controlled drain pipe connected to said port, said outlet tube terminating in said outlet port, each basket chamber having valve-controlled means for supplying back-flushing water to the outlet compartment thereof, the arrangement being such that when the inlet and outlet ports for that basket chamber are closed, said valve in the drain pipe may be opened and the valve for admitting the back-flushing water opened and water may flow from around the outside of the strainer basket to the interior of the basket and out said drain pipe.

8. A twin basket strainer comprising:
  a. a composite body structure having an inlet end wall and an outlet end wall, the body having first and second transverse partitions therein providing an inlet portion at the inlet end between the first transverse partition and the end wall at the inlet end of the body and an outlet portion between said second transverse partition and the outlet end wall of the body,
  b. the body having a longitudinal partition therein extending between the two transverse partitions dividing the interior of the mid portion of the body into two basket chambers side by side,
  c. each basket chamber being constructed to provide an inlet compartment and an outlet compartment,
  d. a removable basket strainer in each chamber with the chamber being so formed that liquid must flow from the inlet compartment above the tops of the baskets downwardly through the top of each basket strainer to the outlet compartment,
  e. the first transverse partition having two ports therein positioned side by side, one opening into the inlet compartment of each chamber and the second transverse partition having two ports therein aligned with the ports in the first with each of said ports leading from one of the outlet compartments to the outlet end portion of the body,
  f. a rock shaft mounted in the body extending above the top of the longitudinal partition above the level of the baskets from one end of the body to the other and projecting at one end through one end of the composite body, the projecting end having operating means thereon,
  g. the shaft having two valve elements thereon and connected thereto for arcuate movement therewith, one valve element being inside said inlet portion for movement over one or the other of said ports in the first transverse partition and the other valve element is aligned on the shaft with the first and positioned to be moved over one or the other of said ports in the second transverse partition.

* * * * *